US009776338B2

(12) United States Patent
Abe et al.

(10) Patent No.: US 9,776,338 B2
(45) Date of Patent: Oct. 3, 2017

(54) POWER TOOL, SUCH AS A PORTABLE CIRCULAR SAW, HAVING IMPROVED BRAKING AND COOLING

(71) Applicant: MAKITA CORPORATION, Anjo-Shi (JP)

(72) Inventors: Kenji Abe, Anjo (JP); Yusuke Hirata, Anjo (JP); Tatsuya Nagahama, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 401 days.

(21) Appl. No.: 14/164,128

(22) Filed: Jan. 24, 2014

(65) Prior Publication Data

US 2014/0215839 A1  Aug. 7, 2014

(30) Foreign Application Priority Data

Feb. 1, 2013 (JP) .................................. 2013-018541

(51) Int. Cl.
*B26B 7/00* (2006.01)
*B27B 19/14* (2006.01)
(Continued)

(52) U.S. Cl.
CPC .............. *B27B 5/38* (2013.01); *B23Q 11/126* (2013.01); *B25F 5/001* (2013.01); *B25F 5/008* (2013.01);
(Continued)

(58) Field of Classification Search
CPC . B27B 5/38; B25F 5/001; B25F 5/008; H02K 7/106; H02K 9/06; H02K 7/145; B23Q 11/126
(Continued)

(56) References Cited

U.S. PATENT DOCUMENTS 3,212,188 A * 10/1965 Riley, Jr. ................ A01G 3/053
30/216
3,794,898 A * 2/1974 Gross ........................ H02P 3/22
318/258
(Continued)

FOREIGN PATENT DOCUMENTS

EP  1327497 A  7/2003
EP  2305439 A  4/2011
(Continued)

OTHER PUBLICATIONS

Extended European Search Report for counterpart application EP 14152718.4 dated May 27, 2014, including European Search Opinion, European Search Report and examined claims 1-14.
(Continued)

*Primary Examiner* — Ghassem Alie
*Assistant Examiner* — Bharat C Patel
(74) *Attorney, Agent, or Firm* — J-Tek Law PLLC; Jeffrey D. Tekanic; Scott T. Wakeman (57) ABSTRACT

A power tool, for example, a portable circular saw, includes a fan, a motor configured to rotate the fan, an output part or shaft driven by the motor, a motor housing that houses the motor, a grip housing connected to the motor housing, a trigger associated with the grip housing, and a brake member configured to brake a rotation of the motor, the brake member being mounted inside the grip housing. The brake member may be a resistive element of a rheostatic braking system. The housing and fan are configured such that cooling air is directed to cool the brake member.

19 Claims, 7 Drawing Sheets

(51) Int. Cl.

| | | |
|---|---|---|
| *B27B 9/04* | (2006.01) | |
| *B26D 7/06* | (2006.01) | |
| *B26F 3/00* | (2006.01) | |
| *B27B 5/38* | (2006.01) | |
| *B23Q 11/12* | (2006.01) | |
| *H02K 9/06* | (2006.01) | |
| *H02K 7/106* | (2006.01) | |
| *H02K 7/14* | (2006.01) | |
| *B25F 5/00* | (2006.01) | |

(52) U.S. Cl.
CPC .......... *H02K 7/106* (2013.01); *H02K 7/145* (2013.01); *H02K 9/06* (2013.01)

(58) Field of Classification Search
USPC .......... 30/273, 276, 371, 374, 388, 166.3; 173/217, 170, 178, 216; 83/100, 169, 83/168, 112, 177, 471.3; 318/375, 703, 318/757, 759; 388/937
See application file for complete search history.

(56) References Cited

U.S. PATENT DOCUMENTS

| | | | | |
|---|---|---|---|---|
| 4,414,743 A * | | 11/1983 | Pioch | B23D 59/006 30/124 |
| 4,995,094 A * | | 2/1991 | Aio | H01H 9/041 318/545 |
| 5,052,497 A * | | 10/1991 | Houben | B25D 11/005 173/109 |
| 5,268,622 A * | | 12/1993 | Philipp | A61B 17/1626 318/400.08 |
| 5,675,895 A * | | 10/1997 | Mori | B23D 59/006 30/124 |
| 5,685,080 A | | 11/1997 | Amano et al. | |
| 5,701,676 A * | | 12/1997 | Itoh | B23D 59/02 30/388 |
| 5,708,333 A * | | 1/1998 | Kirn | H02P 3/20 318/245 |
| 5,738,177 A * | | 4/1998 | Schell | B25B 23/14 173/178 |
| 5,789,885 A * | | 8/1998 | Seel | B23Q 11/0092 318/123 |
| 5,892,885 A * | | 4/1999 | Smith | H01H 9/061 318/139 |
| 6,013,993 A * | | 1/2000 | Barbisch | H02P 3/06 318/245 |
| 6,078,157 A * | | 6/2000 | Seiler | B60L 7/003 318/375 |
| 6,084,366 A * | | 7/2000 | Koselke | H02P 6/24 318/362 |
| RE37,832 E | | 9/2002 | Nakamura et al. | |
| 6,448,727 B1 * | | 9/2002 | Rotterhusen | H02P 3/06 318/244 |
| 6,543,549 B1 * | | 4/2003 | Riedl | B25B 21/00 173/171 |
| 6,566,005 B1 * | | 5/2003 | Shimma | H01M 2/1055 429/120 |
| 6,866,105 B2 * | | 3/2005 | Pfisterer | B25D 17/20 173/117 |
| 6,984,188 B2 * | | 1/2006 | Potter | B23Q 5/142 173/178 |
| 7,021,400 B2 * | | 4/2006 | Oretti | B23B 31/123 173/176 |
| 7,023,159 B2 * | | 4/2006 | Gorti | H02P 3/12 318/139 |
| 7,064,462 B2 * | | 6/2006 | Hempe | B23D 45/16 173/217 |
| 7,071,645 B2 * | | 7/2006 | Hahn | H02P 3/12 318/362 |
| 7,075,257 B2 * | | 7/2006 | Carrier | H02P 3/12 318/375 |
| 7,112,751 B2 * | | 9/2006 | Turley | H01H 9/063 200/332.2 |
| 7,166,939 B2 * | | 1/2007 | Voigt | B25F 5/008 310/47 |
| 7,219,435 B2 * | | 5/2007 | Yoshida | B23D 59/006 30/124 |
| 7,270,910 B2 * | | 9/2007 | Yahnker | B25F 5/008 30/500 |
| 7,331,408 B2 * | | 2/2008 | Arich | B25D 16/00 173/201 |
| 7,487,844 B2 * | | 2/2009 | DeCicco | B25B 21/00 173/176 |
| 7,526,866 B2 * | | 5/2009 | Schnell | B23D 59/006 144/252.1 |
| 7,537,065 B2 * | | 5/2009 | Gallagher | B24B 23/02 173/170 |
| 7,589,500 B2 * | | 9/2009 | Johnson | B25F 5/00 320/114 |
| 7,605,513 B2 * | | 10/2009 | Tanimoto | H02K 3/18 310/179 |
| 7,786,627 B2 * | | 8/2010 | Riedl | B25F 5/008 310/50 |
| 8,067,916 B2 * | | 11/2011 | Auh | B23D 45/044 318/560 |
| 8,286,359 B2 * | | 10/2012 | Ashfield | B27B 17/0008 30/381 |
| 8,328,599 B2 * | | 12/2012 | Yang | B24B 47/12 451/11 |
| 8,579,043 B2 * | | 11/2013 | Hirayama | B25F 5/02 173/109 |
| 8,627,900 B2 * | | 1/2014 | Oomori | B25F 5/008 173/168 |
| 8,667,694 B2 * | | 3/2014 | Tokunaga | B23D 47/12 30/166.3 |
| 8,739,417 B2 * | | 6/2014 | Tokunaga | B23D 47/12 30/263 |
| 8,765,280 B2 * | | 7/2014 | Ueda | H01M 2/1055 30/500 |
| 8,816,544 B2 * | | 8/2014 | Tanimoto | B24B 23/028 310/50 |
| 8,833,221 B2 * | | 9/2014 | Tomita | B27B 17/00 173/217 |
| 2003/0190877 A1 | | 10/2003 | Gallagher et al. | |
| 2003/0226264 A1 * | | 12/2003 | Zemlok | B27B 9/00 30/383 |
| 2004/0207351 A1 * | | 10/2004 | Hahn | H02P 3/12 318/379 |
| 2005/0160608 A1 * | | 7/2005 | Tanimoto | B23Q 17/2404 30/391 |
| 2005/0168095 A1 | | 8/2005 | Tanimoto et al. | |
| 2005/0245182 A1 * | | 11/2005 | Deshpande | B24B 23/03 451/357 |
| 2006/0179985 A1 * | | 8/2006 | Bohne | B23D 59/006 83/78 |
| 2007/0240892 A1 * | | 10/2007 | Brotto | B23B 45/02 173/217 |
| 2008/0135268 A1 * | | 6/2008 | Tadokoro | B25F 5/02 173/2 |
| 2011/0078910 A1 | | 4/2011 | Tomita et al. | |
| 2011/0081847 A1 * | | 4/2011 | Yang | B24B 23/028 451/359 |
| 2011/0316456 A1 * | | 12/2011 | Rottmerhusen | H02P 25/14 318/381 |
| 2012/0293103 A1 * | | 11/2012 | Forster | B25F 5/00 318/503 |

FOREIGN PATENT DOCUMENTS

| | | |
|---|---|---|
| JP | H09-164501 A | 6/1997 |
| JP | 2005-223961 A | 8/2005 |
| JP | 2008-126344 A | 6/2008 |
| JP | 2010-58186 A | 3/2010 |
| JP | 2010-201516 A | 9/2010 |
| JP | 2011-79075 A | 4/2011 |
| JP | 2012-178945 A | 9/2012 |
| WO | 2009145206 A2 | 12/2009 |

(56) References Cited

FOREIGN PATENT DOCUMENTS

OTHER PUBLICATIONS

Amendment and Argument filed in counterpart application EP 14152718.4 dated Feb. 5, 2015.
Extended European Search Report for related application EP 14152718.4 dated May 27, 2014.
Office Action from the Japanese Patent Office dated Apr. 26, 2016 in counterpart Japanese application No. 2013-018541, and English translation of substantive portions thereof.

* cited by examiner

FIG.7

POWER TOOL, SUCH AS A PORTABLE CIRCULAR SAW, HAVING IMPROVED BRAKING AND COOLING

CROSS-REFERENCE

This application claims priority to Japanese patent application no. 2013-018541 filed on Feb. 1, 2013, the contents of which are fully incorporated herein by reference.

TECHNICAL FIELD

The present application is generally directed to a power tool, such as a portable circular saw, and, for example, to a portable circular saw having improved braking and cooling features.

BACKGROUND ART

In dynamic braking, an electric motor is used as a generator for slowing or stopping an object that was being driven by the motor. In one type of dynamic braking, referred to as "regenerative braking," the current output by the generator (motor) is used to charge a battery or is otherwise stored. In another type of dynamic braking, referred to as "rheostatic braking," the current output by the generator (motor) flows through a resistor, a resistor network or other resistive device(s) and is dissipated as heat. Rheostatic braking may be used to slow the accessory (tool) driven by a power tool when the power tool is intended to be turned off. For example, when the trigger switch (button) of a circular saw is released, it is known to use the continued rotation (inertia) of the saw blade to drive the motor (now acting as a generator) to produce current and to then dissipate this current using resistive devices. Thus, when pressed, the trigger switch closes a power circuit to drive the motor and operate the circular saw and when released, the trigger switch closes a braking circuit to brake the saw blade. Such a braking circuit includes one or more resistive devices or resistive elements.

SUMMARY OF THE INVENTION

It is an object of the present teachings to provide an improved power tool such as a portable circular saw having a brake member that brakes the rotation of the motor.

In addition or in the alternative, it is an object of the present teachings to provide an improved power tool such as a portable circular saw that can advantageously cool one or more resistive elements of a rheostatic braking arrangement, which resistive elements may also be referred to herein as a "brake member."

According to this object, the cooling may beneficially improve operator comfort by reducing the temperature of power tool parts touched by the operator and may prevent other elements of the power tool, including temperature-sensitive electronic circuitry inside the power tool, from overheating.

In a first aspect of the present teachings, a power tool comprises a motor that rotates a fan, an output part that is driven by the motor, a motor housing that houses the motor, a grip housing that is connected to the motor housing, and a trigger that is provided on the grip housing. In this arrangement, a brake member (e.g., a lead wire), which is for braking the rotation of the motor, is provided inside the grip housing.

In a second aspect of the present teachings, a power tool comprises a motor that rotates a fan, an output part that is driven by the motor, a housing that houses the motor and wherein a grip is formed, a trigger that is provided at the grip, and a battery holding part that is provided on the housing. In this arrangement, a brake member (e.g., a lead wire), which is for braking the rotation of the motor, is provided inside the housing.

In a third aspect of the present teachings, a portable circular saw comprises a motor that rotates a fan, a rotary shaft driven by the motor and capable of securing a saw blade, a motor housing that houses the motor, a grip housing that is connected to the motor housing, and a trigger that is provided on the grip housing. In this arrangement, a brake member (e.g., a lead wire), which is for braking the rotation of the motor, is provided inside the grip housing.

In a fourth aspect of the present teachings, a portable circular saw comprises a motor that rotates a fan, an output part that is driven by the motor, a housing, including a grip that houses the motor and that has an air suction port and an exhaust port, and a trigger that is provided on the grip. In this arrangement, a brake member (e.g., a lead wire), which is for braking the rotation of the motor, is disposed between the air suction port and the exhaust port inside the housing.

According to a fifth aspect of the present teachings, a power tool comprises a motor housing, a motor in the motor housing, a fan configured to be rotated by the motor to draw air into the motor housing and an output part driven by the motor. The power tool includes a handle having a first end connected to the motor housing, and the handle extends away from the motor housing and forms a loop configured to be gripped by a user. A trigger is provided on the handle, and a brake member configured to brake rotation of the motor is mounted inside the handle.

According to a sixth aspect of the present teachings, a portable circular saw comprises a fan configured to draw air into an interior of the portable circular saw, a motor configured to rotate the fan, and a rotary shaft operably connected to the motor and drivable by the motor. The rotary shaft is configured to secure a saw blade. The circular saw also includes a motor housing that houses the motor and a handle having a first end connected to the motor housing. The handle includes a trigger, and the trigger extends into a gap between the handle and the motor housing. The circular saw also includes a brake member configured to brake rotation of the motor that is provided inside the handle.

According to a seventh aspect of the present teachings, a power tool comprises a housing having an air suction port and an exhaust port and a handle portion. The power tool includes a fan configured to draw air into the housing, a motor configured to rotate the fan, an output part driven by the motor, and a trigger provided on the handle portion and configured to be squeezed into handle portion. The power tool also includes a brake member configured to brake rotation of the motor, and the brake member is disposed in the handle portion and within an airflow path extending from the air suction port into the handle portion past the brake member and to the exhaust port. The housing includes a motor housing portion, and the handle portion includes a first end connected to the motor housing portion at a first location and a second end connected to a battery holding part at a second location spaced from the first location. An intermediate portion of the handle portion, which is disposed between the first end and the second end, is spaced from the motor housing portion, and the trigger is located on the intermediate portion.

In each of these aspects of the present teachings, it is possible to prevent the brake member, which is preferably one or more braking resistors (i.e. electrical resistive element(s)), from overheating or running hot. Consequently, it is possible to prevent, for example, the grip portion of the power tool from becoming uncomfortably hot, temperature-sensitive components from being damaged by heat, etc.

BRIEF DESCRIPTION OF THE DRAWINGS

These and other aspects and features of the present disclosure will be better understood after reading the following detailed description and appended claims in connection with the attached drawings wherein:

DETAILED DESCRIPTION OF THE DRAWINGS

Referring now to the drawings, which are provided solely for purpose of illustrating presently preferred embodiments of the invention and do not limit the invention, FIGS. 1-4 show the outer appearance of an exemplary circular saw 1. The circular saw 1 is provided with a main body 3, which comprises a discoidal (circular or disc-shaped) saw blade 6 rotationally driven by a motor 4 on a base 2, which base 2 is rectangular in plan view. The main body 3 includes a motor housing 7 that houses the motor 4, a grip housing 8 coupled to the motor housing 7, and a blade case 9 that covers an upper part of the saw blade 6. Inside the blade case 9, the saw blade 6 is orthogonally coupled to a tip of a rotary shaft 10 (an "output part") that is parallel to and axially supported by an output shaft 5 of the motor 4. The output shaft 5 thus serves to transmit rotation of the motor 4 to the rotary shaft 10. A battery holding part 11 is formed in the grip housing 8, and two battery packs 12, which constitute a power supply, are slidably mountable onto the battery holding part 11. A safety cover 6a covers a lower part of the saw blade 6 when the circular saw 1 is not in use.

A front side of the blade case 9 (the right side in FIG. 2) is pivotally mounted on the base 2 via a U-shaped coupling plate 13 and a screw 14 so that the blade case 9 can be rotated in the vertical direction relative to the base 2. A guide plate 15 extends from the base 2 and includes an arcuate guide groove 16. A bolt 17 extends from the coupling plate 13 through the guide groove 16, and a lever 18 projects from the bolt 17. By moving the lever 18, the bolt 17 moves in the guide groove 16 and allows the coupling plate 13 to be rotated on the base 2.

In addition, a guide plate 19 is provided on a rear side of the blade case 9 and has an arcuate guide groove 20. A depth guide 21, which curves arcuately toward the front and to the side of the blade case 9, is fixedly coupled, at an arbitrary or user-settable position along the guide groove 20, to the guide plate 19 by a thumbscrew 22. A roller 23 is provided on a side surface of the blade case 9. The roller 23 passes through the depth guide 21 and is configured (adapted) to be clamped in any position by a lever 24 at a tip of the roller 23.

With the above-described arrangement, the main body 3 can be rotated about the screw 14 by changing the position along the depth guide 21 at which the blade case 9 is clamped, and this makes it possible to adjust the amount by which the saw blade 6 protrudes below the base 2, in other words, to adjust the cutting depth of the saw blade 6. In addition, by changing the position at which the coupling plate 13 and the depth guide 21 are fixed to the front and rear guide plates 15, 19, the main body 3 can be fixed at an arbitrary tilt angle, the tilt angle ranging from a right angle position at which the saw blade 6 is orthogonal to the base 2 to a maximum tilt position at which the main body 3 is tipped toward the right side and the saw blade 6 is tilted at a 45° angle with respect to the base 2. Furthermore, notches 25 are formed, in a front end of the base 2, at a right angle (0°) position and at a 45° position of the saw blade 6, and the side edges of the notches 25 are positioned along an extension of the saw blade 6. By aligning the side edges of the notches 25 with an inked line inscribed on an upper surface of a working material, e.g., a board to be cut, it is possible to easily cut along the inked line.

The grip housing 8 has a curved or loop shape that is formed by assembling (joining) two half housings 26, i.e., left and right split housing parts, using screws 27. An upper side of the grip housing 8 comprises a (rear-side) grip part 8a that can be gripped by one of a user's hands and a (front-side) holding part 8b that can be gripped by the other hand. The holding part 8b protrudes on the front side of the circular saw 1.

Figure 1:
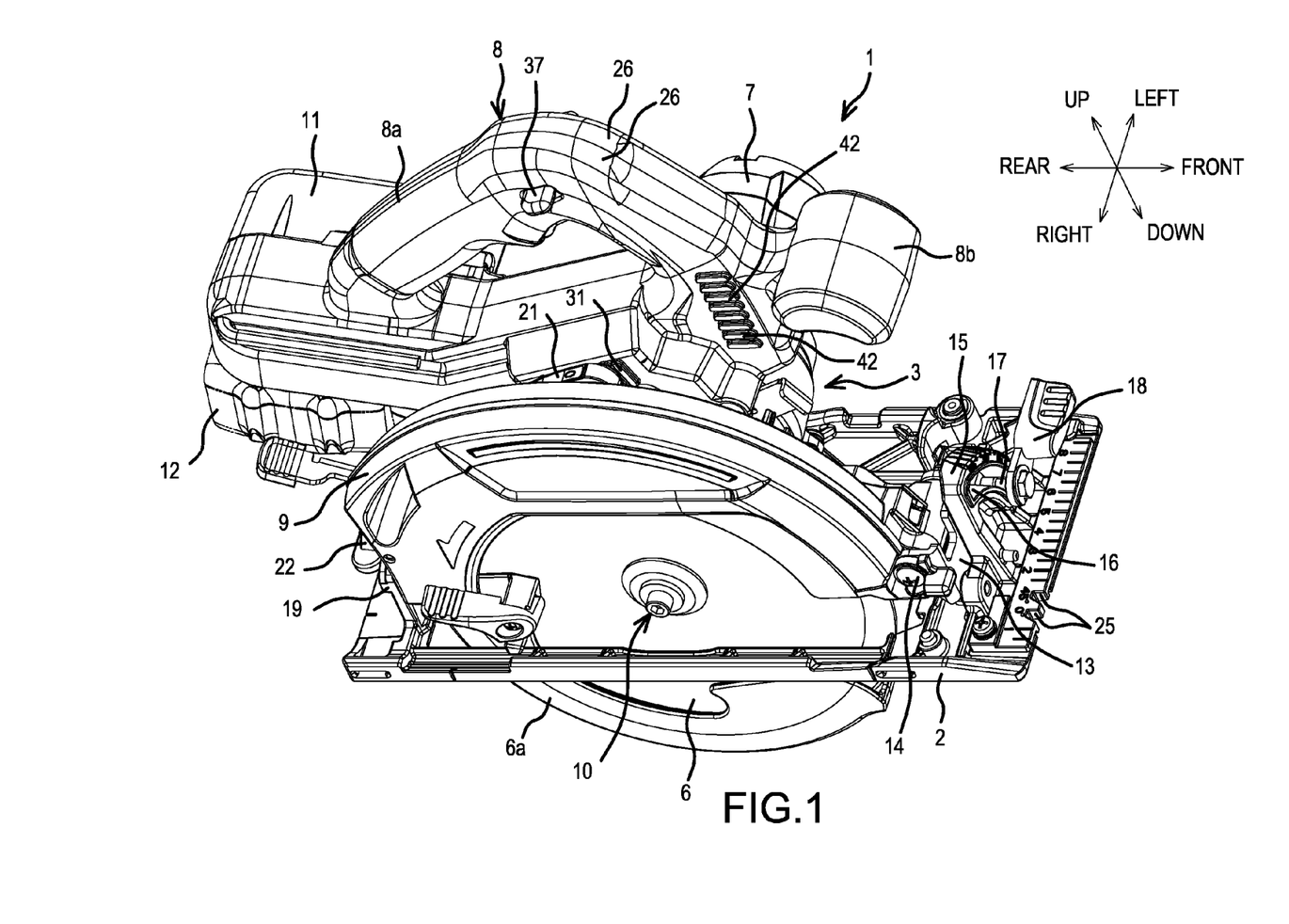
FIG. 1 is an oblique view of a portable circular saw according to an exemplary embodiment of the present teachings.
Figure 2:
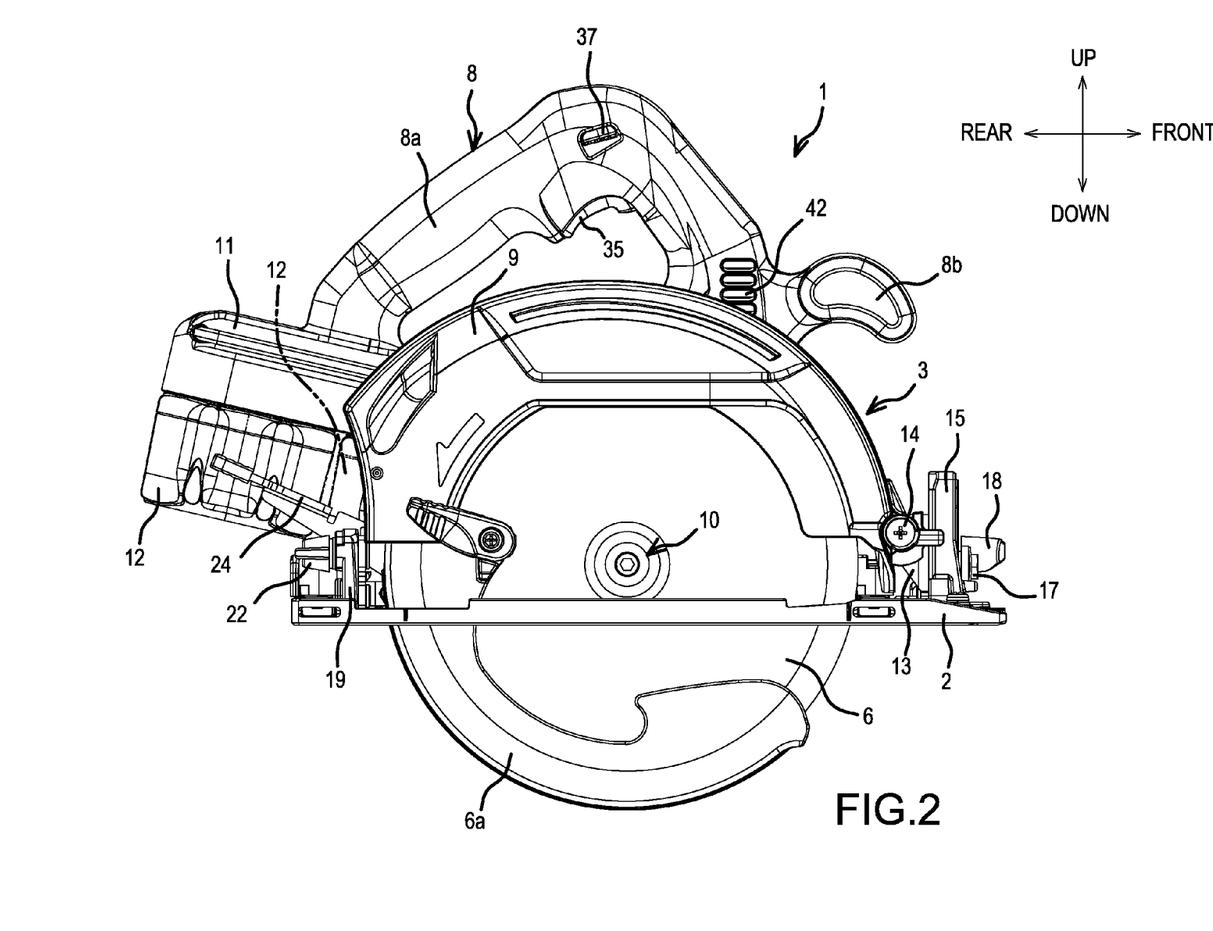
FIG. 2 is a left view of the portable circular saw of FIG. 1.
Figure 3:
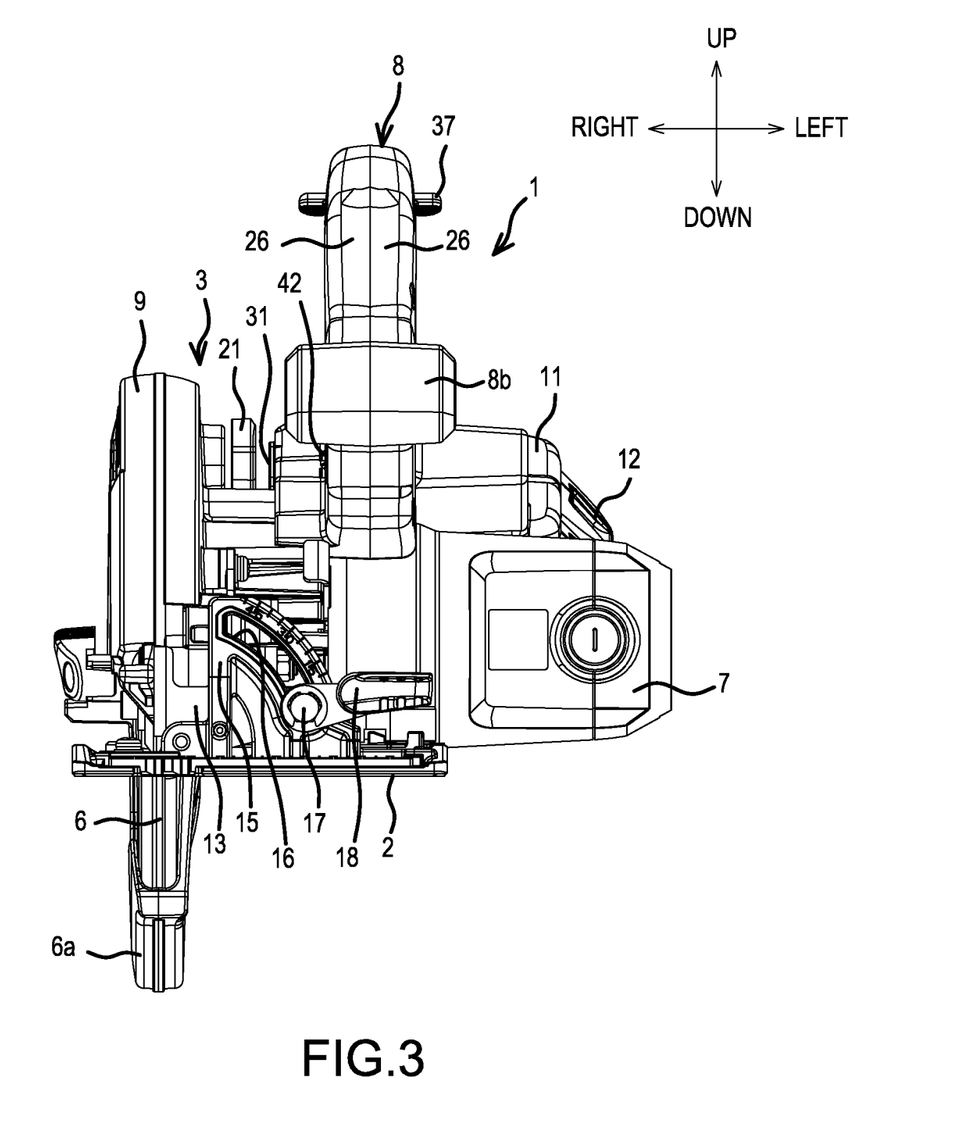
FIG. 3 is a front view of the portable circular saw of FIG. 1.
Figure 4:
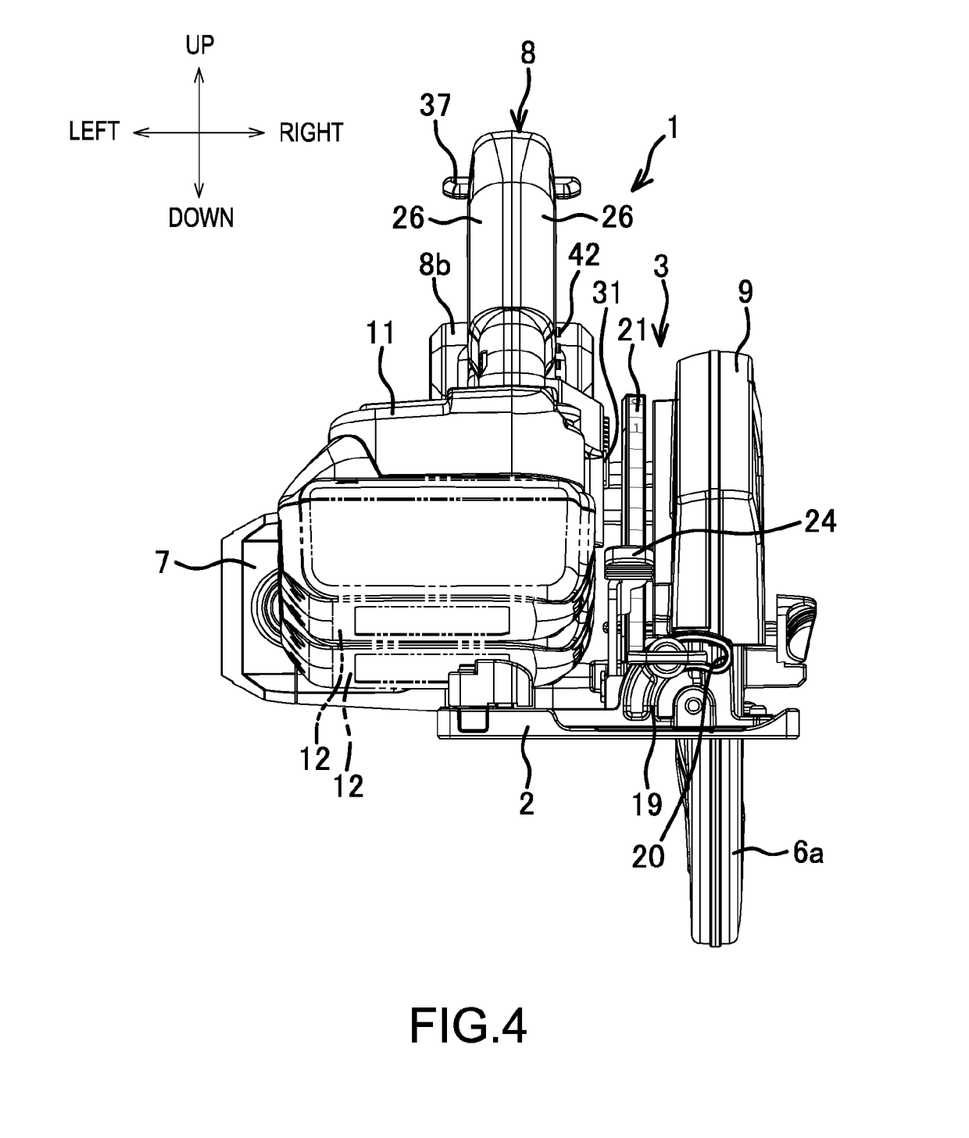
FIG. 4 is a rear view of the portable circular saw of FIG. 1.
Figure 5:
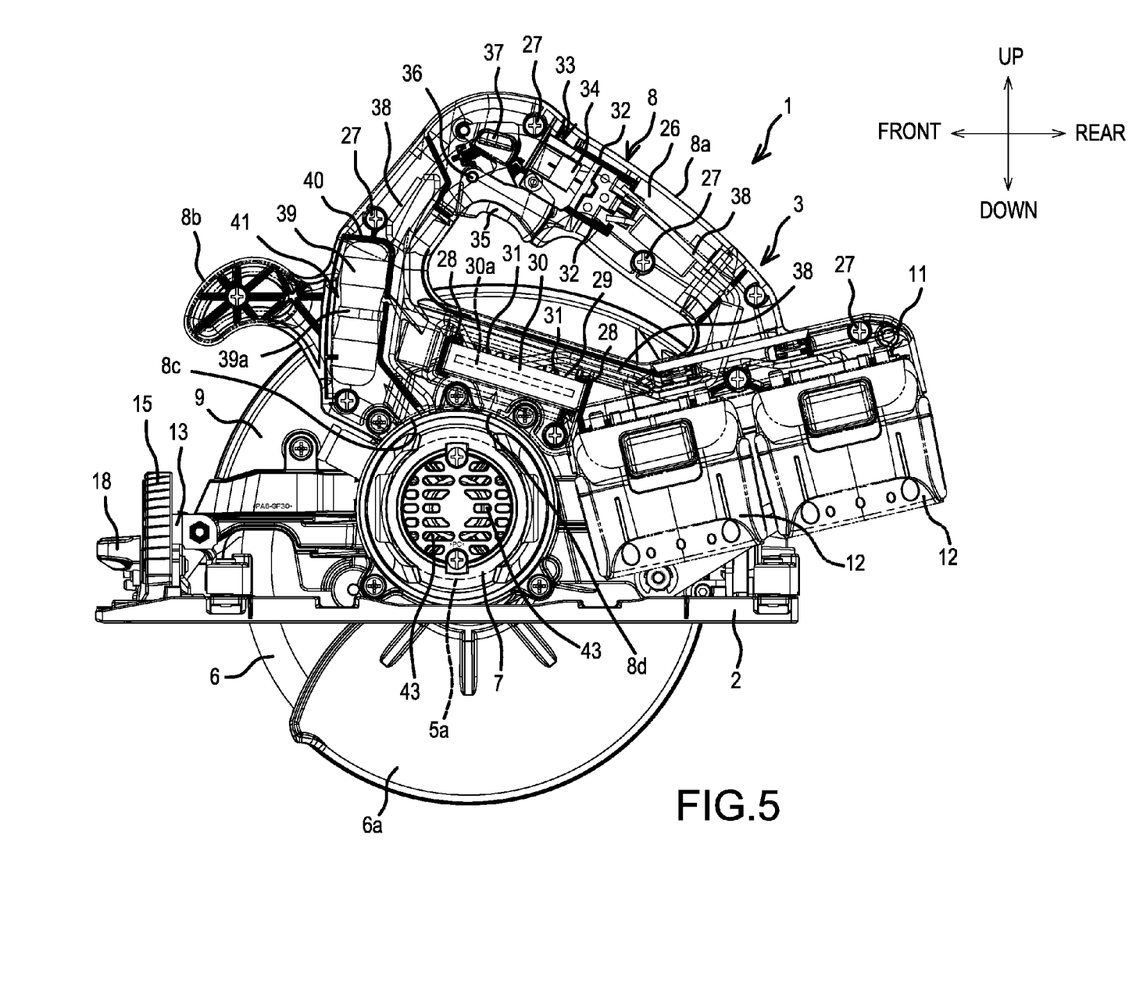
FIG. 5 is a right elevational view, partly in section, of the portable circular saw of FIG. 1.

FIG. 5 is an elevational view showing the circular saw 1 with the left side half housing 26 removed. On the lower inside portion of the grip housing 8, a controller holding part 29 is formed with ribs 28 that extend perpendicularly on an inner surface of the half housing 26. The controller 30 is housed in the controller holding part 29. A plurality of exhaust ports 31 are formed in the right side half housing 26 at the location of the controller holding part 29.

The controller 30 comprises an electronic (printed) circuit board 30a. A switching device and a microcontroller are mounted on the circuit board 30a. The electronic circuit board 30a has a first portion housed in a resin case at an upper part opening and a second portion at which the surface of the electronic circuit board 30a is covered by an insulative filling member that fills the case.

Electric power (current) is supplied via a first lead wire from the battery packs 12 to a power terminal on the upper surface of the electronic circuit board 30a. In addition, a second lead wire extends from a power terminal on the upper surface of the electronic circuit board 30a to the motor 4, and a third lead wire extends from a power terminal on the upper surface of the electronic circuit board 30a to a lead unit (bundled wire unit) 39, which will be further described below. The filling member discussed above is formed such that it also covers the connecting parts between the electronic circuit board 30a and the first, second, and third lead wires.

A switch holding part 33 formed with ribs 32 is provided inside the grip part 8a, which ribs 32 extend perpendicularly on the inner surface of the half housing 26. A switch 34 is housed in the switch holding part 33. A trigger (trigger switch) 35 is mounted forward of a plunger (not shown) of the switch 34 such that the trigger 35 can rotate about a shaft 36 and turn the switch 34 ON by a push-in (squeezing)

operation. A lock-off button (safety switch) 37 is biased toward a position that prevents the trigger 35 from being pushed in and can be slid to either the left or the right to a position that permits the trigger 35 to be pushed in, thereby enabling operation of the circular saw 1.

The controller 30, the switch 34, the battery packs 12 and the motor 4 are connected by lead wires 38. Thus, as shown in the circuit diagram of FIG. 7, when the switch 34 is turned ON by the operation of pushing in the trigger 35, a drive circuit of the motor control circuit is electrically completed (closed) to drive the motor 4. When the switch 34 is turned OFF by the operation of releasing the trigger 35, the drive circuit of the motor control circuit is opened and a braking circuit of the motor control is completed (closed). The inertia (rotational energy) of the rotating saw blade 6 causes the motor 4 to continue to rotate, which now acts as a generator that transmits current through the braking circuit of the motor control circuit.

Figure 7:
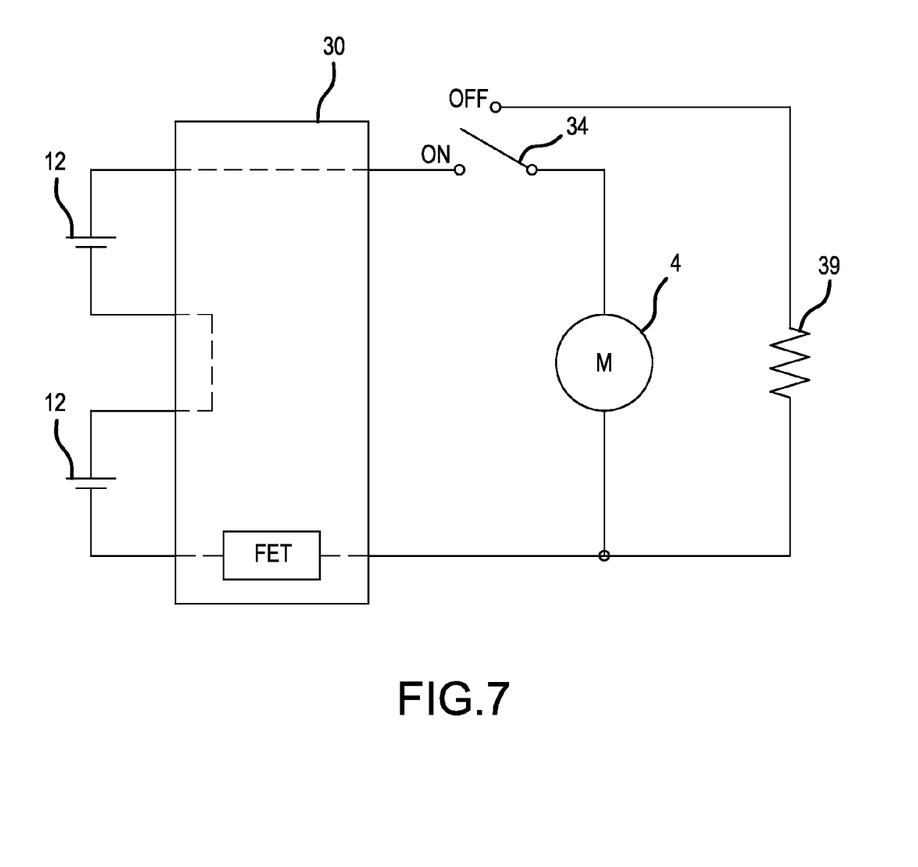
FIG. 7 is an exemplary circuit diagram of a motor control circuit that is usable in the portable circular saw of FIG. 1.

This current is then dissipated as heat in the lead unit 39 according to the rheostatic braking effect, thereby forcibly slowing down (braking) the rotation of the motor 4. That is, when the motor 4 is operating as a generator, the brake member (i.e., the lead unit 39) effectively applies a dynamic braking force to the motor 4, which converts at least a portion of the remaining inertial energy of the motor 4 into heat. As a result, the motor 4 and thus the saw blade 6 come to a stop more quickly than if no braking force is applied.

Thus, it is necessary to provide at least one braking resistor (i.e., a brake member such as the lead unit 39) for constricting (limiting or dissipating) the braking current in the closed loop. In the present exemplary embodiment, the braking resistor takes the form of a long lead wire. The lead unit 39 may be formed by repeatedly folding (or overlapping) the lead wire in one place and binding (bundling) it with a band 39a, to make it easy to fit the bundled wire (in a compact manner) inside the grip housing 8. The lead unit 39 is housed in a lead unit holding part 41, which includes a rib 40 extending perpendicularly from the inner surface of the half housing 26 and forward of the controller 30. A plurality of exhaust ports 42 are also formed also on the right side half housing 26 at or proximal to the location of the lead unit holding part 41.

It should be understood that the above-described lead unit is merely one type of a resistor that may be utilized with the present teachings, and other types of resistors, such as a cement resistor (e.g. a wirewound resistor having a ceramic outer case) and the like, can also be used. That is, a wide variety of other types of resistors and/or multiple resistors or resistive devices can be used as appropriate to resist and/or dissipate the current flow generated by the motor while it is operating as a generator, to thereby apply a dynamic braking effect to the motor when the trigger has been released.

The optimal resistance of the lead unit 39 will depend upon the particular application of the present teachings, and in particular factors such as, e.g., the mass and normal rotating speed of the rotating tool (which will determine the peak current value when the lead unit 39 begins functioning as a generator) and the desired stopping time. However, it is noted that preferred resistances of the lead unit 39 fall within the range of 100-500 ohms, more preferably 200-400 ohms. Higher resistance values may be appropriate in case the peak current value is relatively high and the power tool contains sufficient space to house a correspondingly larger lead unit.

The material of the lead wire within the lead unit 39 may be a solid wire or a stranded wire and may be comprised of any appropriate conductive material, such as e.g., copper or tin-plated annealed copper stranded wire (cable). The lead wire may be encased or coated with an insulating material, e.g., comprised of cross-linked polyethylene, having a high resistance to heat (i.e. a high melting temperature).

A fan 5a is attached to the output shaft 5 of the motor 4, and the rotation of the fan 5a caused by the rotation of the output shaft 5 sucks cooling air into the motor housing 7 through air suction ports 43 in a left end surface of the motor housing 7. Because the interior of the grip housing 8 is in fluid communication with the interior of the motor housing 7, the cooling air sucked in from the air suction ports 43 passes through the motor 4 and reaches the interior of the grip housing 8. The cooling air branches at the grip housing 8, one branch being discharged from the exhaust ports 31 on the side of the controller 30 and the other branch being discharged from the exhaust ports 42 on the side of the lead unit 39 as shown by the thin-lined arrows in FIG. 6.

Figure 6:
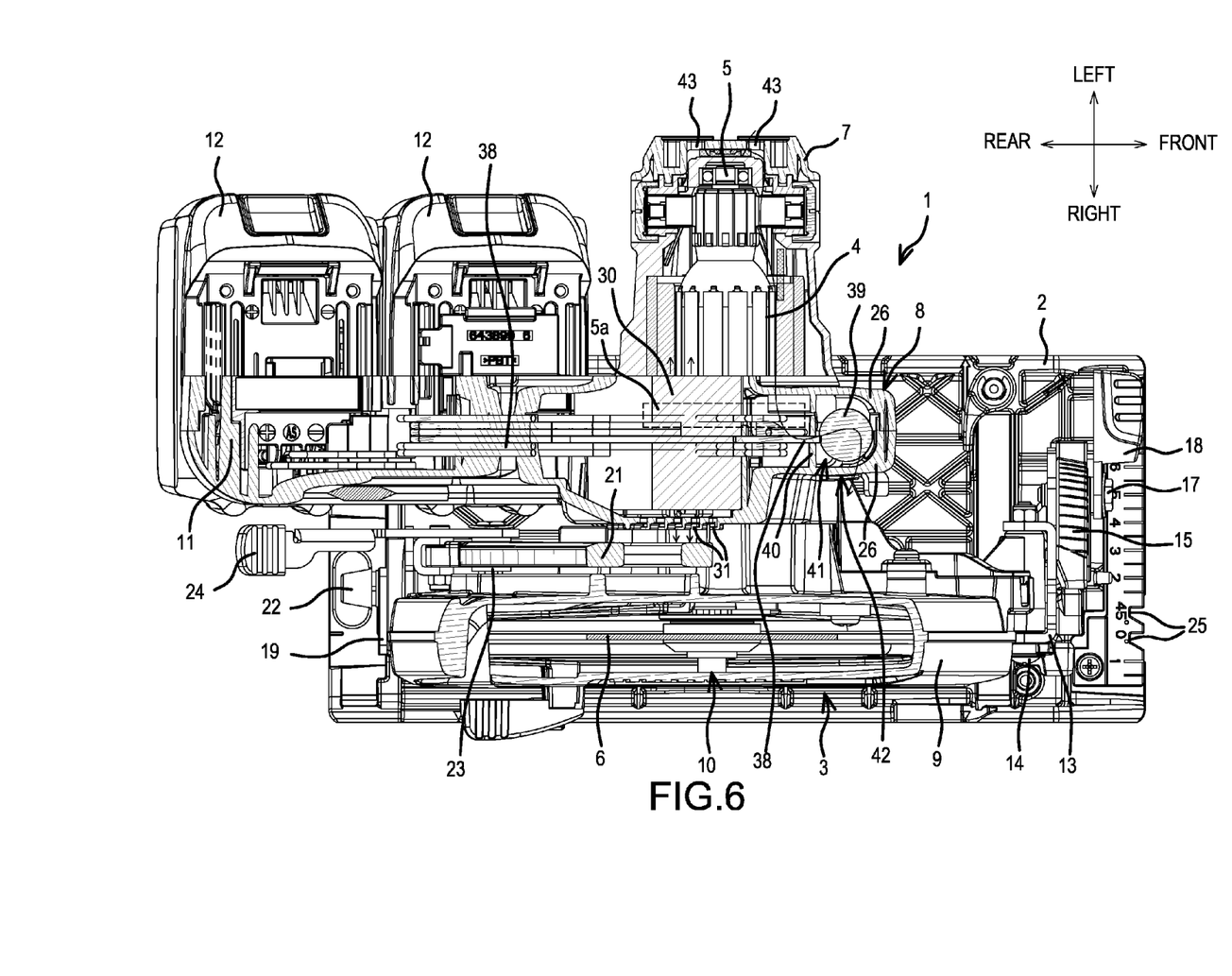
FIG. 6 is a top plan view, partly in section, of the portable circular saw of FIG. 1.

By disposing the lead unit 39 and the controller 30 on the outer side of the fan 5a in the radial direction as shown in FIGS. 5 and 6, a compact structure is ensured.

In the circular saw 1 configured as described above, when the trigger 35 is pushed in (squeezed), it turns on the switch 34, and power supply voltage (current) is supplied from the battery packs 12 to the motor 4. This drives the motor 4 and the output shaft 5, which in turn rotates the rotary shaft 10 and the saw blade 6, making it possible to cut the working material (a work piece such as a board, etc.).

When the trigger 35 is released, the switch 34 transitions to the OFF position and, at this time, the braking current is generated by the motor 4 due to the inertia of the rotating saw blade 6. The braking current flows to the lead unit 39, which is in the closed circuit state and dissipates the braking current (e.g., as heat), thereby dynamically braking the rotation of the motor 4.

The cooling air that is sucked in from the air suction ports 43 by the rotation of the fan 5a passes through the interior of the motor 4, and, as discussed earlier, cools the motor 4. When the cooling air reaches the interior of the grip housing 8, it branches, one branch flowing past the controller 30 and being discharged from the exhaust ports 31 and the other branch flowing past and/or through the lead unit 39 and being discharged from the exhaust ports 42. This airflow cools both the controller 30 and the lead unit 39.

For example, a lid unit branch hole 8c and a controller branch hole 8d are formed in the grip housing 8, and the fan 5a moves the cooling air from the motor housing 7 to the lid unit branch hole 8c and to the controller branch hole 8d, as indicated by the thin-lined arrows in FIG. 5. In this manner, the lead unit 39 is cooled by the cooling air flowing from the lower end part to the upper end part of the housing. In addition, the controller 30 is configured such that the cooling air blows against its lower surface.

Thus, in the circular saw 1 of the above-described embodiment, it is possible to suitably prevent the lead unit 39, which comprises the braking resistor or braking member, from running hot (overheating) by using the cooling air supplied by the motor 4. This in turn makes it possible, e.g., to prevent the user's hand holding the grip part 8a from feeling uncomfortable due to excessive heat from the braking resistor and/or to reduce the likelihood that temperature-sensitive components of the circular saw 1 will be damaged by excessive heat.

Various modifications may be made to the preferred embodiment without departing from the scope of the present teachings.

For example, the location of the lead unit 39 is not limited to the position shown in the above-described embodiment and may be changed, e.g., to the upper side or the rear side of the position shown in the above-described embodiment, as long as the interior of the grip housing 8 can be cooled by the cooling air supplied by the motor 4.

In addition or in the alternative, although the above-described embodiment adopts a configuration wherein the cooling air supplied by the motor 4 is branched so that the controller 30 is also cooled, it is also possible to adopt a configuration wherein the cooling air does not branch. In this case, only the lead unit 39 is actively cooled by the cooling airflow supplied by the motor 4.

In addition or in the alternative, in the above-described embodiment, a configuration is adopted wherein the cooling air cools the lead unit 39 and the controller 30 after cooling the motor 4; however, a configuration may instead be adopted such that the cooling air cools motor 4 after having cooled the lead unit 39, or such that the cooling air cools motor 4 after having cooled the controller 30, or the like.

In addition or in the alternative, although the above-described embodiment adopts a configuration wherein the lead unit 39 is disposed inside the grip housing 8, the lead unit 39 may instead be disposed inside the motor housing 7.

In addition or in the alternative, the above-described embodiment provides an exemplary example of a portable circular saw that uses two battery packs as the power supply; however, the portable circular saw may be configured to use just one battery pack, or to use an AC power supply without being limited to a rechargeable system, etc. Of course, the present invention is not limited to a portable circular saw and can also be adapted to a wide variety of other types of power tools, that are either, e.g., battery powered or powered by alternating current, e.g., from a power supply mains or a portable generator.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide an improved circular saw or other power tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Portable circular saw
2 Base
3 Main body
4 Motor
5 Output shaft
5a Fan
6 Saw blade
7 Motor housing
8 Grip housing
8c Lid unit branch hole
8d Controller branch hole
9 Blade case
10 Rotary shaft
11 Battery holding part
12 Battery pack
26 Half housing
29 Controller holding part
30 Controller
30a Electric circuit board
31, 42 Exhaust ports
34 Switch
35 Trigger
38 Lead wire
39 Lead unit
41 Lead unit holding part
43 Air suction port

The invention claimed is:

1. A power tool comprising:
a motor housing;
a motor in the motor housing;
a fan configured to be rotated by the motor to draw air into the motor housing;
an output part driven by the motor;
a handle having a first end connected to the motor housing, the handle extending away from the motor housing and forming a loop configured to be gripped by a user;
a trigger provided on the handle; and
a brake member configured to brake rotation of the motor, the brake member being mounted inside the handle, wherein an airflow path is defined in the power tool leading from the fan into the handle, past the brake member and to an exhaust port in the handle, the fan being configured to move air downstream from the fan into the handle, past the brake member and out the exhaust port.

2. The power tool according to claim 1, wherein the brake member comprises a resistive element of a rheostatic braking system configured such that the resistive element dissipates a current generated by the motor as heat when the motor operates as a generator during a braking operation.

3. The power tool according to claim 2, including a first branch hole and a second branch hole, the first branch hole being configured to direct a portion of an airflow generated by the fan towards the brake member and the second branch hole being configured to direct another portion of the airflow generated by the fan towards an electric circuit board disposed inside the handle.

4. The power tool according to claim 1, including a battery pack holding part disposed at an end of the handle.

5. The power tool according to claim 1, including:
a battery pack holding part disposed at an end of the handle;
an electric circuit board disposed inside the handle; and
a first branch hole and a second branch hole, the first branch hole being configured to direct a portion of an airflow generated by the fan through the airflow path across the brake member and the second branch hole being configured to direct another portion of the airflow generated by the fan towards and across the electric circuit board.

6. The power tool according to claim 1, wherein the power tool comprises a circular saw.

7. The power tool according to claim 3, wherein the fan is configured to move the air over the motor to cool the motor before the air enters the handle.

8. The power tool according to claim 3, wherein the power tool comprises a circular saw.

9. The power tool according to claim 8, wherein the resistive element comprises a lead wire repeatedly folded and bound with a band.

10. A portable circular saw comprising:
a fan configured to draw air into an interior of the portable circular saw;
a motor configured to rotate the fan;
a rotary shaft operably connected to the motor and drivable by the motor, the rotary shaft being configured to secure a saw blade;
a motor housing that houses the motor;
a handle having a first end connected to the motor housing, the handle including a trigger, the trigger extending into a gap between the handle and the motor housing; and
a brake member configured to brake rotation of the motor, the brake member being provided inside the handle,
wherein the brake member comprises a resistive element of a rheostatic braking system, and
including an airflow path defined in the portable circular saw leading from the fan, into the handle and past the brake member, the brake member being disposed within the airflow path, and
including an exhaust port defined in the handle at a downstream end of the airflow path.

11. The power tool according to claim 10, wherein the rheostatic braking system is configured such that the resistive element dissipates a current generated by the motor as heat when the motor operates as a generator during a braking operation and wherein the airflow path and fan are configured to move air past the motor to cool the motor and then into the handle.

12. A power tool comprising:
a housing having an air suction port and an exhaust port, the housing including a handle portion,
a motor in the housing,
a fan rotated by the motor and configured to draw air into the housing through the air suction port and move the air past the motor to cool the motor and then downstream of the motor into the handle portion;
an output part driven by the motor;
a trigger provided on the handle portion and configured to be squeezed into handle portion; and
a brake member configured to brake rotation of the motor, the brake member comprising a resistive element of a rheostatic braking system configured such that the resistive element dissipates a current generated by the motor as heat when the motor when the motor operates as a generator during a braking operation, the brake member being disposed in the handle portion and positioned such that air entering the handle portion after cooling the motor flows past the resistive element to cool the resistive element before exiting the housing through the exhaust port.

13. The power tool according to claim 12, wherein the exhaust port is located in the handle portion.

14. The power tool according to claim 12, wherein:
the housing includes a motor housing portion,
the handle portion includes a first end connected to the motor housing portion at a first location and a second end connected to a battery holding part at a second location spaced from the first location,
an intermediate portion of the handle portion, which is disposed between the first end and the second end, is spaced from the motor housing portion, and
the trigger is located on the intermediate portion.

15. The power tool according to claim 12, wherein the power tool comprises a circular saw.

16. A power tool comprising:
a fan configured to draw air into an interior of the power tool and generate an airflow;
a motor configured to rotate the fan;
an output part driven by the motor;
a motor housing that houses the motor;
a handle having a first end connected to the motor housing, the handle extending away from the motor housing and having a trigger on a portion of the handle facing the motor housing;
an exhaust port defined in the handle; and
a rheostatic braking system comprising a resistive element electrically connected to the motor, the resistive element being configured to dissipates a current generated by the motor as heat when the motor operates as a generator during a braking operation;
wherein at least part of the resistive element is located in the handle and
an airflow path extends from the fan to the exhaust port in the handle such that at least one portion of the airflow downstream of the fan flows into the handle, over the resistive element to cool the resistive element and out the exhaust port.

17. The power tool according to claim 16, including a first branch hole and a second branch hole, the first branch hole being configured to direct the at least one portion of the airflow generated by the fan towards the resistive element and the second branch hole being configured to direct another portion of the airflow generated by the fan towards an electric circuit board disposed inside the handle.

18. The power tool according to claim 16, wherein:
the handle has a second end connected to a battery holding part such that the handle forms a loop; and
a circular saw blade is operatively coupled to the output part.

19. The power tool according to claim 16, wherein the fan is configured to move air over the motor to cool the motor before the air enters the handle.

* * * * *

UNITED STATES PATENT AND TRADEMARK OFFICE
CERTIFICATE OF CORRECTION

PATENT NO. : 9,776,338 B2  Page 1 of 1
APPLICATION NO. : 14/164128
DATED : October 3, 2017
INVENTOR(S) : Kenji Abe It is certified that error appears in the above-identified patent and that said Letters Patent is hereby corrected as shown below:

In the Claims

In Claim 7, at Column 9, Line 6, replace "claim 3" with "claim 1".

In Claim 8, at Column 9, Line 9, replace "claim 3" with "claim 1".

In Claim 16, at Column 10, Line 34, replace "dissipates" with "dissipate".

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*